United States Patent [19]

Knuth et al.

[11] Patent Number: 5,010,730
[45] Date of Patent: Apr. 30, 1991

[54] GAS-FED HYBRID PROPULSION SYSTEM

[75] Inventors: William H. Knuth; John H. Beveridge, both of Huntsville, Ala.

[73] Assignee: Acurex Corporation, Mountain View, Calif.

[21] Appl. No.: 434,526

[22] Filed: Nov. 7, 1989

Related U.S. Application Data

[63] Continuation of Ser. No. 159,782, Feb. 24, 1988, abandoned.

[51] Int. Cl.$^5$ ............................................. F02K 5/00
[52] U.S. Cl. ........................................ 60/246; 60/251; 60/262; 60/263
[58] Field of Search ............... 60/246, 251, 253, 259, 60/262, 263

[56] References Cited

U.S. PATENT DOCUMENTS

| | | | |
|---|---|---|---|
| 3,158,992 | 12/1964 | Hodgson | 60/251 |
| 3,158,994 | 12/1964 | Hodgson | 60/251 |
| 3,334,489 | 8/1967 | Vilet | 60/251 |
| 3,613,583 | 10/1971 | Lai et al. | 60/251 |
| 3,709,652 | 1/1973 | Iwanciow et al. | 60/251 |
| 3,782,112 | 1/1974 | Muzzy | 60/251 |
| 3,943,706 | 3/1976 | Grafwallner et al. | 60/259 |
| 4,424,679 | 1/1984 | Holzman | 60/251 |
| 4,589,253 | 5/1986 | Wagner | 60/259 |

FOREIGN PATENT DOCUMENTS

646363 8/1962 Canada .................................. 60/251

OTHER PUBLICATIONS

Merrifield, John T., "Aerojet TechSystems Develops Hypersonic Aircraft Engine", *Aeronautical Engineering*, pp. 57-60, Oct. 14, 1985.

Primary Examiner—Louis J. Casaregola
Assistant Examiner—Timothy S. Thorpe
Attorney, Agent, or Firm—Flehr, Hohbach, Test, Albritton & Herbert

[57] ABSTRACT

Self-contained hybrid propulsion systems have long been recognized as a class of propulsion systems that combine a liquid propellant and a solid propellant into a single system. The propellants are stored separately and the liquid propellant is delivered to the motor casing that holds the solid propellant. The present invention contemplates gasifying the liquid propellant prior to introduction into the motor casing in order to enhance system performance. The solid propellant grain is ignited and partially burned generating heat to evaporate the remaining solid propellant grain at a controlled rate. The resulting mixture is then passed to a secondary combustion region where it is mixed with additional gasified liquid propellant to complete the combustion. An integrated turbopump assembly including a pump portion, a preburner portion and a turbine portion is provided to pressurize and gasify the liquid propellant.

23 Claims, 4 Drawing Sheets

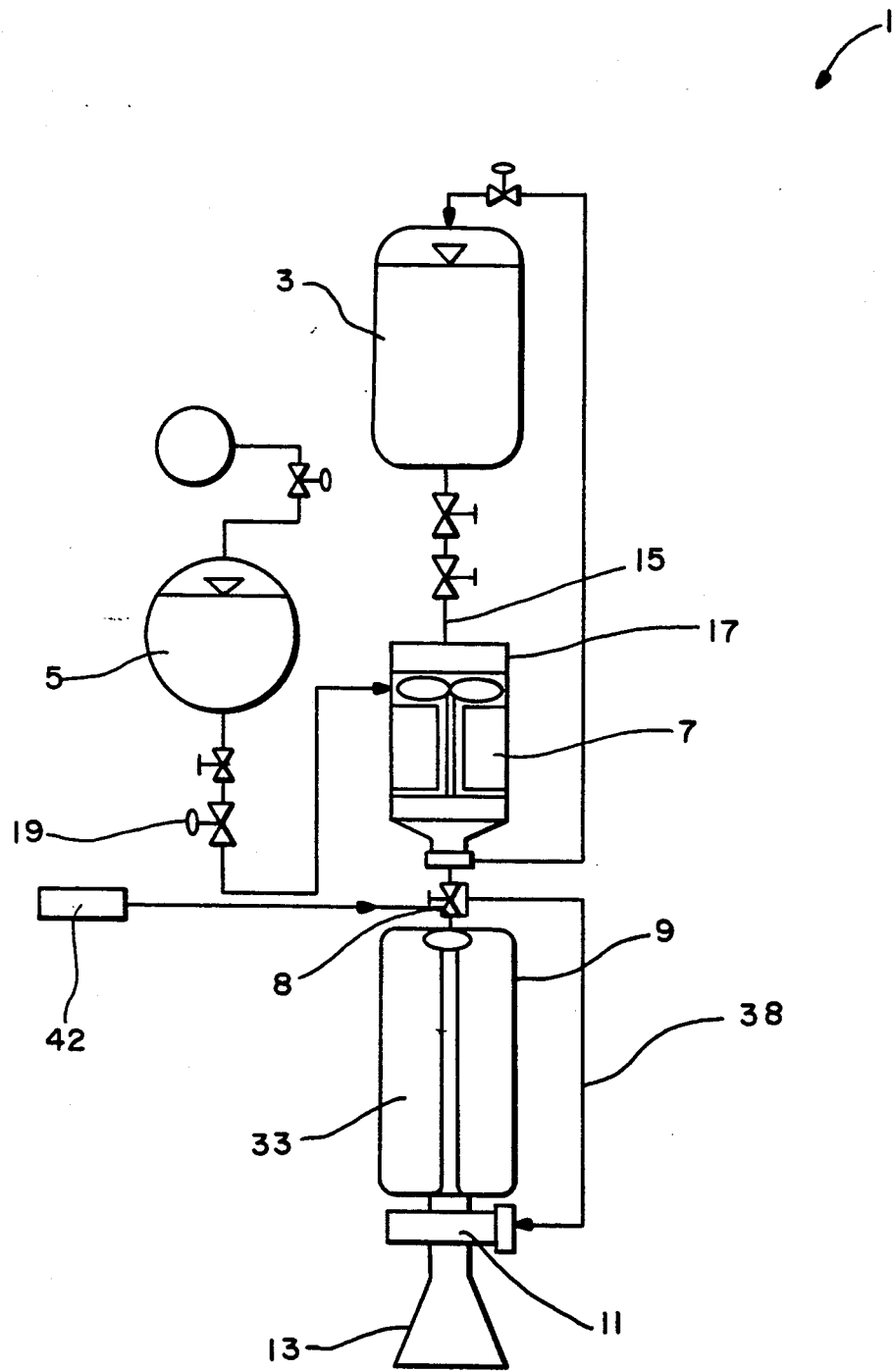
FIG.—1

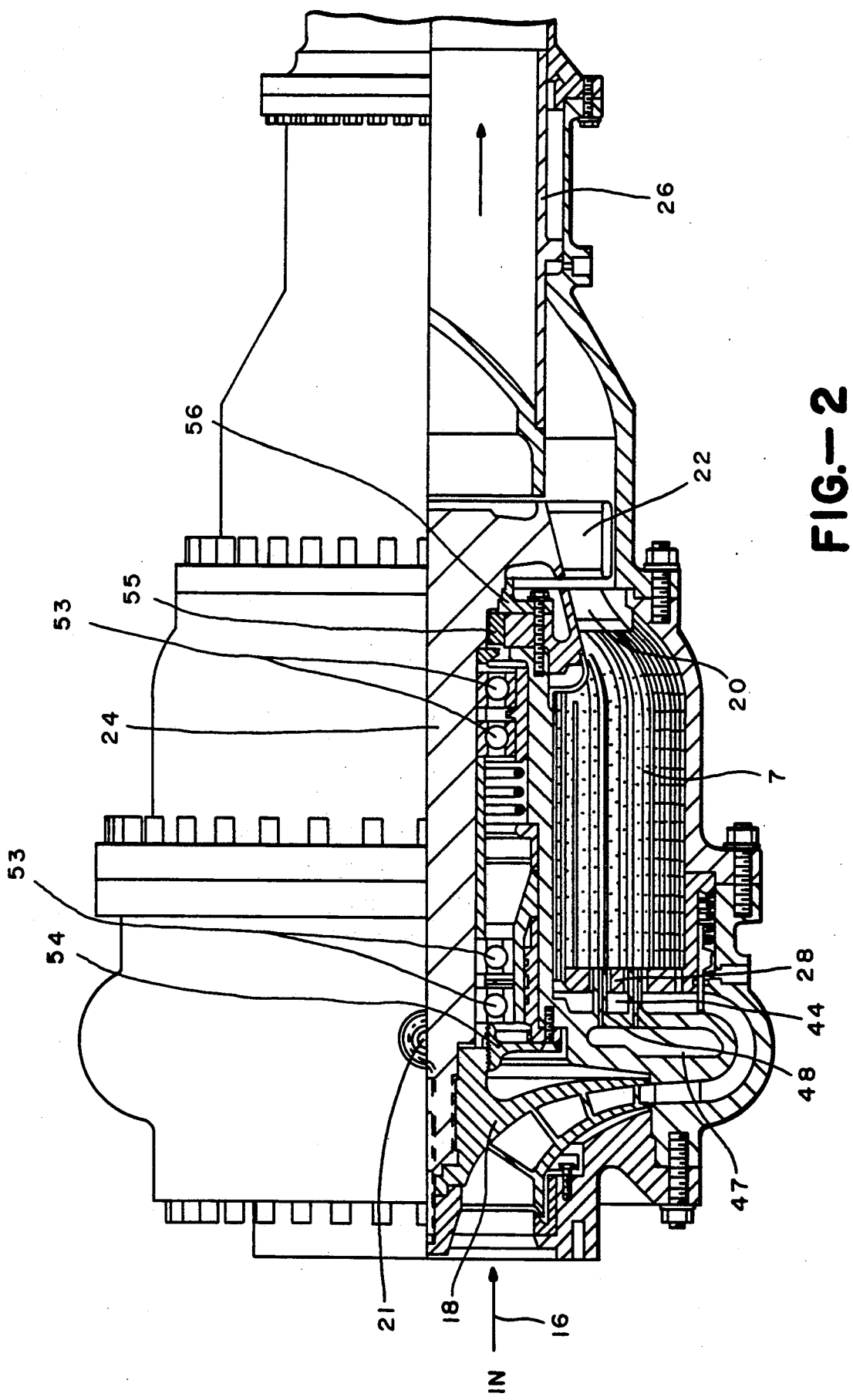

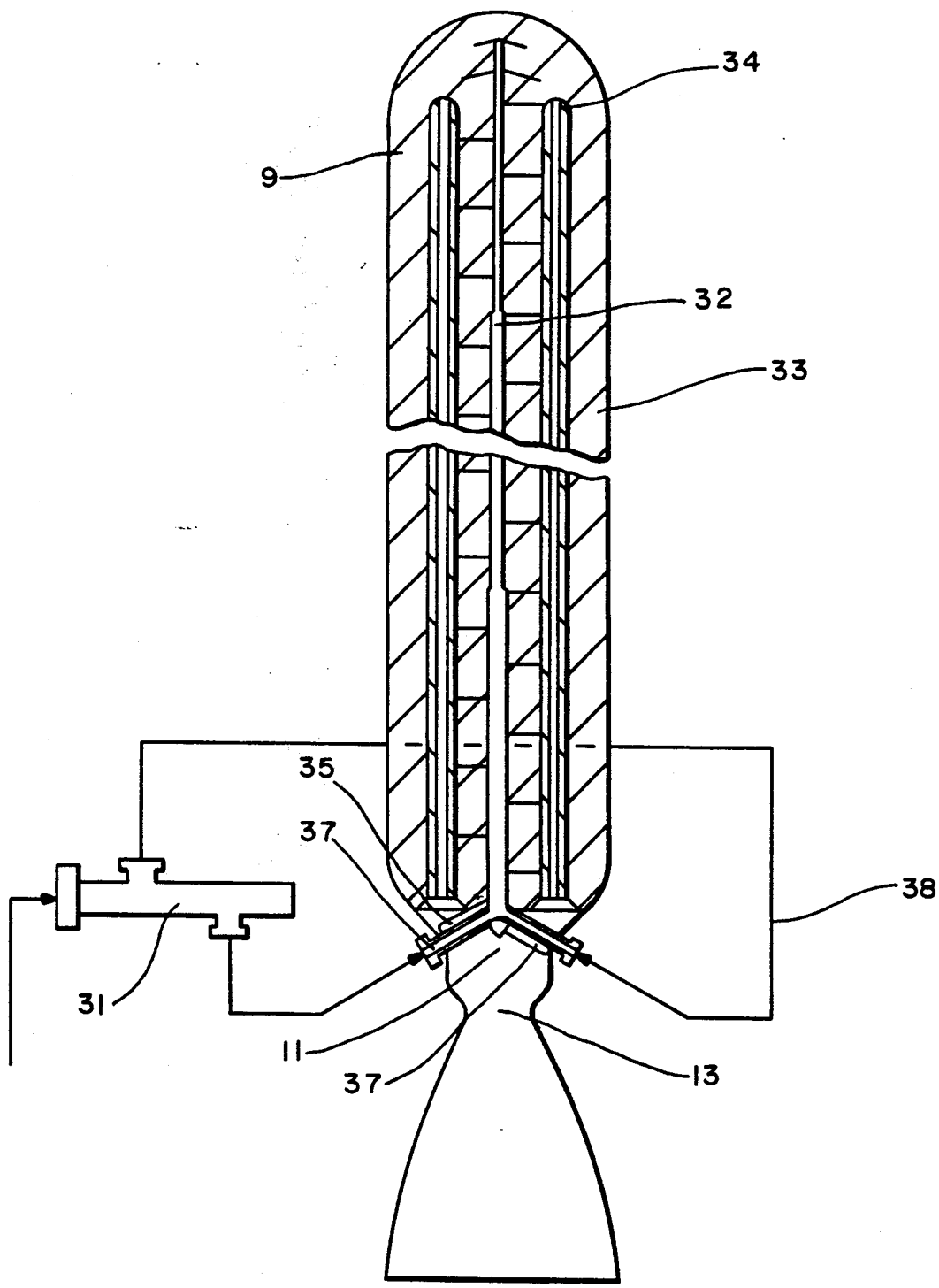
FIG.—3

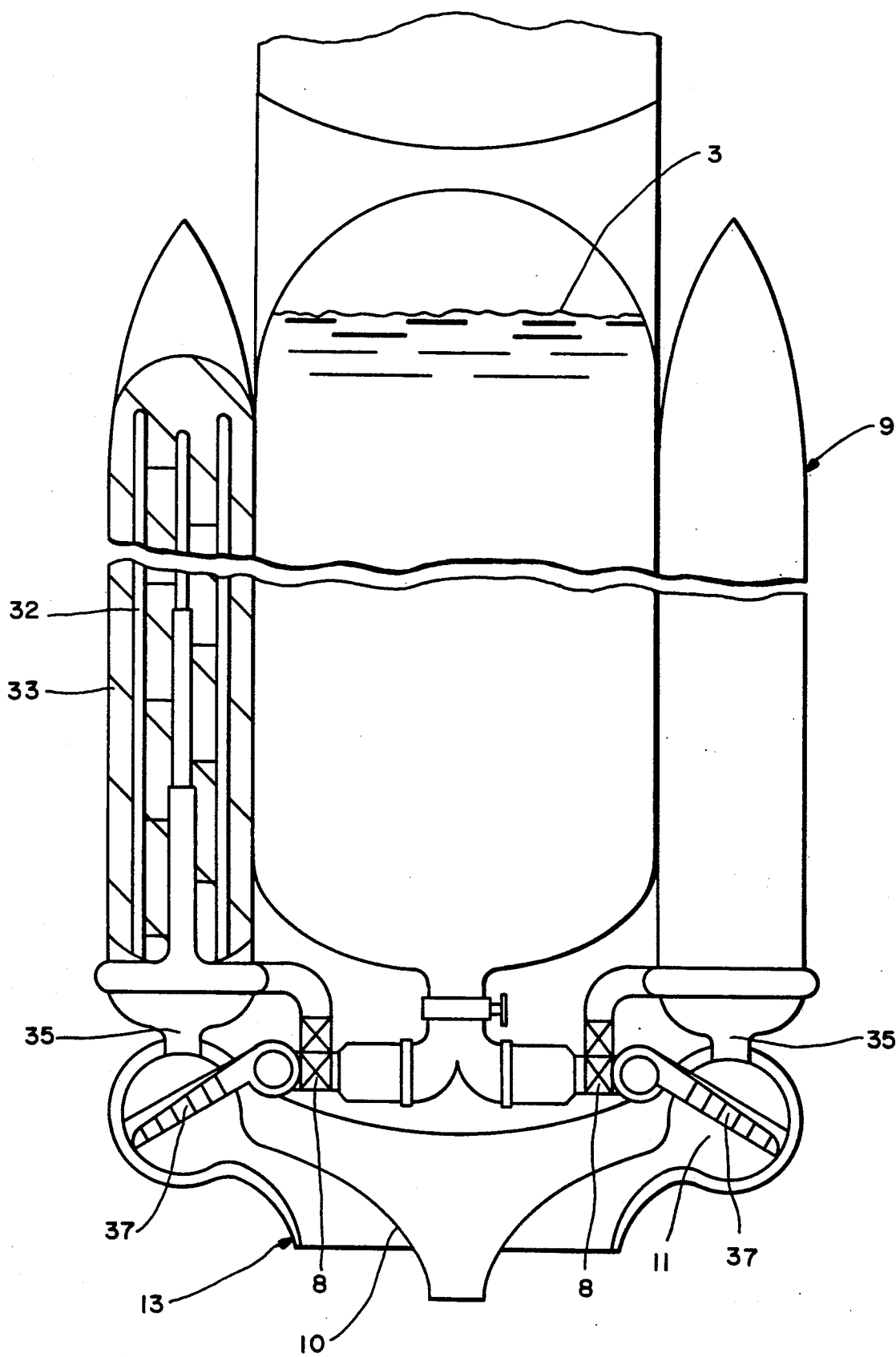
FIG.—4

GAS-FED HYBRID PROPULSION SYSTEM

This is a continuation of application Ser. No. 159,782 filed on Feb. 24, 1988 now abandoned.

BACKGROUND OF THE INVENTION

The present invention relates generally to a hybrid rocket propulsion system. More particularly, the invention discloses a hybrid propulsion system that provides a gasified oxidizer to a solid propellant fuel in a controlled fashion to safely and efficiently regulate burning, thereby controlling thrust and performance of the rocket.

A hybrid propulsion system combines both solid propellants and liquid propellants into a single propulsion system. Traditional liquid propulsion systems incorporate all liquid propellants while solid propulsion systems include only propellants in solid forms. A third class of propellant systems may be referred to as hybrid systems which utilize one propellant in the form of a solid propellant grain encased within a pressure housing while the opposite propellant is delivered into the pressure housing in either a liquid or gaseous form. Combustion is initiated upon contact between the two propellants in the presence of an ignition source. The resulting high-pressure products of combustion may be used to perform work. The propulsion system discussed in this application will be described in the environment of a rocket engine. In such systems the combustion products are expanded through a convergent divergent (laval) nozzle, and accelerated to a high velocity thereby providing a reaction force that may act as the rocket thrust. Generically either the fuel or the oxidizer may be used as the solid propellant while the opposite propellant is delivered in fluid form.

The hybrid rocket is similar in some respects to solid fuel ramjets and to ducted rockets. Solid fuel ramjets incorporate a solid fuel grain contained within a motor casing. As the ramjet travels through the atmosphere, its forward velocity delivers ram air to the fuel grain in a forced manner. Oxygen within the air serves as the oxidant to achieve combustion.

Ducted rockets function similarly to solid fuel ramjets except that some oxidizers are contained within the motor casing and may be used for such purposes as ignition of the fuel, stabilization of the flame, and/or to augment burning by providing additional oxidants to support combustion. The major difference between hybrid rockets and ducted propulsion devices is that the latter receive some, if not all, of its oxidizers from the medium through which it flies. In contrast, the hybrid rocket, like other true rockets, is completely self-contained carrying all of its own propellants and therefore is not dependent upon the surrounding medium to support combustion.

Hybrid rockets have certain advantages over both liquid and solid rockets. In contrast to bipropellant liquid rockets, the hybrid requires only a single propellant supply system. This greatly simplifies the mechanics of the systems since only a single propellant tank is required along with a single propellant turbopump, a single set of connecting lines and valves, as well as a single pressurization systems, etc. Such benefits are further amplified if there is a need for redundant propellant delivery systems. Therefore, hybrids represent a major simplification of the vehicle and pay substantial dividends in the form of better safety, reliability, and economy. Further, since one of the propellants (usually the fuel) is in the form of a solid, the necessary size of the propellant storage system is considerably reduced. Furthermore, safety is considerably enhanced since it is extremely unlikely that propellant mixing will occur in areas that are likely to produce explosions and/or fires such as those known to occur in bipropellant liquid rockets.

One principal advantage that the hybrid has over a solid motor is that the thrust of the hybrid can be easily controlled, adjusted, or terminated. For example, the rate of injection of the liquid propellant can be controlled which facilitates throttling over a wide thrust range. Further, hybrid rocket motors avoid the mixing and curing problems encountered when combining fuel and oxidizer constituents into a single propellant grain.

Another major advantage of the hybrid over purely solid propellants is that solid oxidizers inherently consist of a high percentage of inert matter, which necessarily results in lower propellant performance. Liquid oxidizers, on the other hand, are virtually all oxidizer and therefore have lower weight requirements and higher burning temperatures. Consequently, a well designed hybrid propulsion system using a liquid oxidizer in combination with a solid fuel grain can ideally approach the performance of a liquid rocket and out perform conventional solid fuel rocket motors.

Contemporary hybrid rockets utilize liquid oxygen sprayed under pressure into the combustion region of a solid fuel grain. While such an approach achieves the advantages discussed above, it also has several drawbacks which have limited the practicality of hybrid systems to date. For example, injection of cold liquid oxygen into the region of the fuel grains frequently result in the liquid droplets eroding the grain in an undesirable pattern. Specifically, such erosion makes it difficult to control the location and rate of burning, as well as making it difficult to control the mixture ratio. Thus, such systems typically have less than optimum performance. Additionally, such systems incur nozzle streaking and/or erosion problems which stem from the presence of unburned oxygen.

Therefore, there is a need for a hybrid rocket system which is amenable to accurate combustion control and capable of overcoming the aforementioned difficulties with current hybrids.

SUMMARY OF THE INVENTION

Accordingly, it is a primary objective of the present invention to provide an improved hybrid propulsion system that facilitates a controllable and uniform solid grain regression.

Another object of the present invention is to provide a rocket propulsion system that is safe and not susceptible to propellant explosions.

A more specific object of the present invention is to provide a hybrid rocket propulsion system that delivers a gasified propellant to the solid propellant grain to improve combustion characteristics.

Another object of the invention is to provide a hybrid rocket propulsion system capable of utilizing liquid propellants carried at low tank pressures.

Another object of the present invention is to provide a liquid propellant gasification assembly that is capable of pressurizing the fluid introduced therein to a working pressure.

Another object of the present invention is to provide a turbopump assembly that has an internal preburner that produces the turbine drive fluid.

To achieve the foregoing and other objects and in accordance with the purpose of the present invention, a self-contained propulsion system is provided with a motor casing that houses a solid propellant grain. A first fluid propellant, that will combust when in contact with the solid propellant in the presence of an ignition source, is stored separately from the solid propellant in a fluid tank. A gasification means is provided for gasifying the fluid propellant, while a delivery means supplies at least a portion of this gasified propellant to the fuel grain. An ignition means initiates burning within the motor casing.

The propulsion system includes a second fluid propellant that will combust with the first fluid propellant when ignited. The gasification means includes a preburner assembly wherein the first and second fluid propellants are combined and partially burned to produce combustion heat to gasify unburned propellants.

Preferably, the oxidant is the first fluid propellant and is stored as a liquid. In such an embodiment, the oxidant (the first fluid), and the fluid fuel (the second fluid), are mixed and combusted in the preburner. The resulting mixture forms an oxidizer rich flowstream that is directed at least in part to the main motor casing for combustion with the main solid fuel propellant therein. The fluid fuel/oxidant ratio within the preburner is selected so that enough fuel is used to ensure that all of the oxidant and fluid fuel is gasified, and to produce a gas temperature that is optimized for use with the propellant.

In a preferred aspect of the invention, a secondary combustion chamber is provided spaced apart from the motor casing. The burning and vaporizing fuel grain within the motor casing is designed to produce a fuel-rich mixture that is channeled into the secondary combustion chamber. Means is provided for delivering a second portion of the oxidant rich mixture to the secondary combustion chamber for burning with the fuel rich mixture.

In yet another preferred aspect of the present invention, pumps low pressure liquid propellant to pressures desirable for use within the propulsion system, using the combustion products of the preburner to drive a turbine which pressurizes the liquid propellant. Most preferably, substantially all of the gasified fluid propellants from the preburner are available to drive the turbine.

BRIEF DESCRIPTION OF THE DRAWINGS

The features of the present invention that are believed to be novel are set forth with particularity in the appended claims. This invention, together with further objects and advantages thereof, may best be understood by reference to the following description of the presently preferred embodiment taken in conjunction with the accompanying drawings in which:

FIG. 1 is a schematic diagram of a hybrid rocket motor constructed in accordance with the present invention.

FIG. 2 is a partially broken away side view of a turbopump suitable for us in the present invention.

FIG. 3 is a broken away schematic side view of a motor assembly suitable for use in the present invention.

FIG. 4 is a diagrammatic view of a rocket assembly including a plurality of solid propellant motor casings ducted into a single torroidal chamber in accordance with an alternative embodiment of the present invention.

DETAILED DESCRIPTION OF THE DRAWINGS

As illustrated in the drawings, the hybrid propellant system 1 of the present invention includes a fluid oxidizer tank 3, a fluid fuel tank 5, a preburner assembly 7 for combining the fluid propellant and combusting the mixture to gasify the fluid propellants, and a main motor casing 9. In the embodiment described herein, the hybrid propulsion system takes the form of a rocket motor. In this embodiment, a main fuel propellant grain 33 is carried in the motor casing 9 and the partially combusted effluent of the motor casing is directed into a secondary combustion chamber 11 where it burns to completion and exits through rocket nozzle assembly 13.

Referring first to FIG. 1, the fluid propellants are preferably stored in liquid form to minimize the required size of the propellant system 1. A liquid oxidant, such as oxygen, is stored in oxidizer tank 3. The oxidizer tank 3 is connected by ducting 15 to preburner 7 within turbopump 17. The turbopump 17 pumps the liquid oxidizer to a working pressure for preburner assembly 7.

Flow of the fluid fuel between fuel tank 5 and the preburner is controlled by thrust control valve 19 which may be controlled by an external controller (not shown). As will be apparent from the description below, the thrust of the entire rocket motor can be regulated by controlling the flow of the fluid fuel from fuel tank 5 into preburner assembly 7. Fuel from fuel tank 5 may be either pressure-fed or pump-fed. By way of example, fuel tank 5 may be pressurized by a suitable inert gas such as nitrogen or helium.

A wide variety of fluid fuels may be used with preference being given to those having relatively high heat output versus weight characteristics. By way of example, suitable fluid fuels include propane, methane, kerosene (RP-1), and hydrogen. For the purposes of this description, the system will be described as if propane is the selected fluid fuel. The propane from fuel tank 5 and the oxygen from oxidizer tank 3 are combined in preburner 7 and combusted. The system is designed such that the fuel/oxidant ratio of the mixture within preburner 7 will include enough propane to ensure that the combustion products and the unburned propellants will both be completely gasified and heated to a prescribed temperature. The term gasified as used herein, is understood to include a supercritical fluid at pressures and temperatures above the vapor dome. Therefore, the liquid oxygen is only partially burned. The heat liberated by the combustion vaporizes the remaining (unburned) oxygen thereby resulting in an oxidizer-rich gas.

Referring specifically to FIG. 2, the operation of turbopump 17 which includes the preburner assembly 7 will be described. The turbopump 17 includes a pump impeller 18, injection nozzles 19, preburner 7, fuel inlet port 21, turbine nozzles 20, turbine wheels 22 and turbopump shaft 24. A shut-off valve 26 is available to stop flow through the turbopump.

In operation, oxygen from oxidizer tank 3 is fed via inlet ducting 15 into the oxidizer inlet 16 of turbopump 17. The pump impeller 18 pumps the oxygen to a high pressure and supplies it, via crossover passages to injector 28. The injector 28 distributes the oxidant flow into the preburner 7 wherein it is partially burned with the fuel (propane) supplied to the preburner through the fuel inlet port 21. The heat liberated by the combustion vaporizes the remaining (unburned) oxygen thereby resulting in an oxidizer-rich gas. This oxidizer-rich gas is directed through turbine nozzles 20 and turbine wheel 22. The turbine wheel 22 is fixably attached to the turbopump shaft 24 which is directly coupled to pump impeller 18. Thus, the turbine drives the pump to provide the energy source necessary to pressurize the liquid oxygen. It will be appreciated that substantially all of the gasified fluid propellants are passed through the turbine and thus used to drive the pump impeller 18. This is advantageous because it allows a substantially lower temperature flowstream to be used to drive the turbine and into the combustion chamber. Since pure oxygen is prone to burn a wide variety of materials, the lowered temperature of the turbine drive fluid (i.e., the oxidizer-rich gas), allows a much wider choice of construction materials for the turbine itself, as well as the piping and bypass valve 8 that channel the oxidizer-rich gas to the gas generator 9 and combustion chamber 11 respectively.

Referring next to FIG. 3, the oxidizer-rich gas leaving turbopump 17 exits through a shut-off valve 26 and bypass valve 8. Bypass valve 8 divides the oxidizer-rich flow stream into two portions. A first portion of the oxidizer-rich flow stream is routed into the motor casing 9, while a second portion of the oxidizer-rich flow is channeled directly to secondary combustion chamber 11. The oxidant-rich gas routed toward the motor casing 9 enters the motor casing at inlet manifold 31. An injector 32 distributes the oxidizer-rich gas over the exposed surface of the solid propellant fuel grain 33. A pyrotechnic-type igniter (typical) 34 fires to cause the fuel grain 33 to ignite in the presence of an oxygen rich environment. The products of combustion are intentionally fuel-rich and flow out of motor casing 9 through a secondary injector 35. The secondary injector 35 directs the fuel-rich gases into secondary combustion chamber 11.

Recalling that the bypass valve 8 divides the oxidant-rich gases into two flow streams, the second portion of the oxidant-rich gas is directed through an oxidizer inlet manifold 37 into the secondary combustion chamber 11. It is contemplated that the oxidant-rich gas and the fuel-rich gas may be mixed in any desired proportions, as for example, substantially stoichiometric proportions or the proportions calculated to maximize thrust. The hot combustion products of combustion chamber 11 expand toward ambient pressure as it passes through convergentdivergent rocket nozzle 40 to produce thrust in a conventional manner.

The primary mechanism for regulating engine thrust is to control the speed of turbopump 17. The turbopump speed, in turn regulates the oxidant flow rate. The turbopump speed may be readily adjusted by controlling the fuel flow rate of the fluid fuel introduced to the preburner 7. It will be appreciated that higher fuel flow rates will produce more combustion and higher preburner temperatures which will increase the speed of the turbopump 17 thereby pumping more oxygen.

Bypass valve 8 is regulated by controller 42 to modulate the division of the oxygen-rich flow between motor casing 9 and combustion chamber 11 to maintain the optimum overall mixture ratio and total thrust. It will be appreciated that the vaporization rate of the solid propellant grain can be controlled by controlling the amount of oxygen delivered into the motor casing 9.

Specifically, increasing the amount of oxidant-rich flow to the motor casing 9 will result in higher combustion temperatures within the motor case and therefore a higher heat input to the fuel grain surface 33. Higher fuel grain surface temperatures will increase the fuel evaporation rate thereby providing a higher fuel mass flow. The higher the fuel mass flow, the larger the rocket thrust.

Controller 42 has the ability to modulate the oxidant-rich gas flow between the motor casing 9 and the combustion chamber 11. Such control (which may be conducted through conventional monitoring and control techniques), accommodates shifting combustion conditions within the motor case while facilitating optimum fuel/oxidizer mixture ratios to achieve the highest system performance. When coupled with the ability to modulate the thrust by controlling the total oxidant flow, this hybrid propulsion system has the capability of producing a prescribed thrust versus time profile while maintaining optimum burning mixture ratios throughout. Therefore, it is to be understood that a desired oxidant delivery profile can be developed prior to actual deployment and controller 42 may be designed to modulate the flow rate of the oxidant-rich gases to provide the desired thrust profile. Controller 42 may also monitor environmental parameters such as temperature and pressure within the motor casing 9 to facilitate feedback control of the bypass valve.

The pump feeding of the oxidant into the preburner assembly 7 has several advantages over the conventional pressure feed oxidant supply systems. Most importantly, substantially lower pressure as possible for storing the oxygen in oxidizer tank 3. By way of example, a tank pressure on the order of 30 psi is appropriate with a pump fed system as opposed to the 400–600 psi tank pressures often used in pressure fed systems. The reduced pressures allow the use of a thinner walled tank, in place of a heavy structural tank, as would be needed for a pressure fed oxidant supply.

Additionally, the combustion chamber pressures can be greatly increased since higher pressure may be used downstream the preburner assembly 7. For example, a pump fed hybrid propulsion system can utilize chamber pressures on the order of 500–1,500 psig as compared to 250–500 psig for pressure fed designs. Higher combustion chamber pressures facilitate the use of smaller, lighter nozzles and enhance overall performance. The higher system pressures are also advantageous in that they allow higher working pressures for the gas injector 32. Higher pressures facilitate better control of propellant distribution (and burning) which leads to better mixture control and larger combustion stability margins. The net result is higher system performance. The pump fed design also has inherent safety advantages since the risk of rupture inherent in high pressure liquid oxygen tanks is greatly reduced.

The system descried also has numerous advantages that stem from the use of gaseous oxidizers. It should be understood that the term "gaseous" is defined to include a super critical fluid at pressures and temperatures above the vapor dome. The use of gaseous oxygen as opposed to liquid oxygen permits a more uniform distribution of the oxidant over the fuel grain thereby promoting rapid and efficient combustion with uniform grain regression rates. Such uniform burning enhances both thrust control and performance. Additionally, safety is enhanced since the gaseous oxygen does not pool in excessive quantities within the motor casing as liquid oxidants have been known to do. Further, the use of gases eliminates the grain erosion that occurs when liquid droplets enter the motor casing. Again, the elimination of the droplets enhances combustion stability and thus provides a more stable grain regression rate.

The use of a staged combustion process (i.e., within both the motor casing 9 and the combustion chamber 11), also has several advantages. A primary benefit of the staged combustion approach is that it allows positive control of the mixture ratio for steady operation as well as for throttling while maintaining the mixture ratio desired for combustion. Since only partial burning occurs within the motor casing, lower temperatures are generated therein which allows a broader range of propellants (fuels) to be used. It will be appreciated that with such an arrangement, high temperatures are confined to a relatively small local region within the secondary combustion chamber 11 and nozzle assemblies which may be ablatively or regeneratively cooled.

The preferred embodiment of the turbopump 17 includes several unique physical features. One of the most notable distinctions is the incorporation of the preburner 7 into the turbopump assembly itself. Referring specifically to FIG. 2, liquid oxygen enters the pump impeller 18 at oxidant inlet 16. The impeller 18 is caused to rotate at a high rate of speed. The centrifugal action of the impeller adds both kinetic and potential (increased pressure) energy to the liquid oxygen. The liquid oxygen then flows into the pump stator 40 which slows the flow thereby increasing pressure and guides the oxygen flow through a shutoff valve 43. When the shutoff valve 43 is open, the oxygen flows directly into the injector manifold 44 and then into the preburner 7. A suitable fuel propellant, such as propane or hydrogen as examples, is provided at a controlled pressure to fuel inlet port 21. The fuel flows into the fuel injector manifold 47 through injection tubes 48 and then passes coaxially with the liquid oxygen into the preburner 7. It will be appreciated that alternative appropriate injection patterns could be used as well. Igniter port 49 is provided in the side of preburner 7 for igniting the fuel/oxygen mixture in a conventional manner. The complete combustion of the fuel is accomplished with low fuel/oxidizer ratios. However, it is preferred that the combustion products thoroughly mix with the unburned oxidant to ensure that the oxidant is heated and gasified to a homogenous fluid state.

The design of the preburner 7 contemplates two distinct processes, each of which occurs within a specific zone of the preburner. The first process is the combustion process, wherein all the injected fuel will be burned in a local region. Such combustion is intended to occur in a centralized zone isolated by the cold raw liquid oxygen, such that the hot flame does not contact the burner wall. By way of example, when hydrogen is the fuel, a mixture ratio of 40 to 1 by weight is appropriate.

The second process is the mixing, heating and (if subcritical), vaporization of the remaining oxygen. For this, it is desirable that the oxygen be injected as fine spray droplets and strongly mixed with the gases from the combustion zone. This may be accomplished by a wide variety of well-known mixing techniques primarily associated with the configuration of the preburner. Additionally, baffles or other deflectors may be placed into the flowpath to enhance mixing and gasification. By way of example, the injectors may be mounted coaxially. Alternatively, the fluid jets may be arranged to impinge upon one another.

After combustion and vaporization, the oxidant-rich gases flow out of preburner 7 through turbine nozzle 20 and impinge upon turbine wheel 22 thereby causing the turbine and its shaft 24 to rotate. The turbine shaft is coupled directly to the pump impeller 18 and therefore drives the pumping necessary to pressurize the oxidant to working preburner pressures.

The rotating assembly (including drive shaft 24) is supported by a plurality of bearings 53 which are cooled by a stream of liquid oxidant. A small amount of liquid oxygen is tapped from the pump stator 40 and is directed through control labyrinth 54, the bearings 53, lift-off seal 55 and a back pressure labyrinth 56. This coolant fluid oxygen is then exited into the turbine cavity where it is assimilated by the oxidant rich mixture driving the turbine.

It will be appreciated that the pressures within the various turbopump cavities act on the rotor to produce axial thrust loads. Conical springs 58 in each bearing set are arranged to permit limited axial shaft movement thereby serving to damp and stabilize dynamic shaft motion.

The turbopump described herein is particularly advantageous in rocket propulsion systems. It is both compact and light in weight. By incorporating the preburner into the pump housing, major savings in weight, costs and complexity are achieved since the pump housing serves multiple purposes. The oxygen flow is kept within the pump housing so that external ducting is not required thereby avoiding extra costs, reducing overall weight and reducing the systems leak potential. The turbopump housing and flow passageways are symmetric about the centerline, which simplifies manufacturing and avoids radial hydraulic loads on the rotating assembly. The liquid oxygen cooled bearings and lift-off seal provide a favorable environment for long bearing and seal service life. Materials coppers, and inconels having excellent compatibility with oxygen-rich environments. Further, since the liquid oxidant used to cool the drive shaft bearings is the same as the gaseous oxidant driving the turbine, they are compatible and there is little danger of explosions within the turbopump. Therefore, the extensive shaft sealing requirements typical of many turbopump designs ar substantially reduced.

Referring next to FIG. 4, it will be appreciated that multiple solid fuel motors could be used in a particular rocket assembly. As seen therein, a common liquid oxidizer tank 3 may be coupled to multiple hybrid motor casings 9, with each motor casing 9 having a solid propellant grain therein. Multiple turbopumps 17 are provided, with each turbopump being associated with a particular or more motor casings. The fuel-rich gases generated by each of the motors may be expelled into a single torroidal shaped combustion chamber. A pintle nozzle plug 10 may be incorporated into the nozzle assembly 9 to facilitate varying the cross-sectional area of the nozzle throat.

Although only a few embodiments of the present invention are described in detail, it should be understood that the present invention may be embodied in many other specific forms without departing from the spirit or scope of the invention. Particularly, it should be understood that a specific propellant used for the oxidizer, the fluid fuel and the solid propellant may be widely varied without departing from the spirit of the invention. Similarly, it is conceivable that an oxidant could be provided in the solid form while a liquid fuel was used to form the hybrid.

Additionally, it will be appreciated that any number of combustion chambers could be used in conjunction with the single liquid propellant tank. Similarly, in the broad application of the system, the turbopump design could be widely varied. Therefore, the present examples and embodiments are to be considered as illustrative and not restrictive and the invention is not to be limited to details given herein, but may be modified within the scope of the appended claims.

We claim:

1. A self contained propulsion system comprising:
   a solid propellant grain;
   a motor casing for containing the solid propellant grain;
   a first fluid propellant that will combust with the solid propellant when ignited, said first fluid propellant being stored in a liquid form apart from the solid propellant;
   gasification means for gasifying substantially all of the first fluid propellant before the propellant is delivered to the motor casing;
   delivery means for delivering at least a portion of the gasified fluid propellant from the gasification means to the motor casing in the region of the solid propellant grain;
   ignition means for initiating burning of the combined propellants;
   a first fluid storage tank for storing the liquified first propellant;
   a second fluid propellant that will combust with the first fluid propellant when ignited;
   a second fluid storage tank for storing the second fluid propellant; and
   wherein said gasification means mixes a flowstream of said first fluid propellant with a flowstream of the second fluid propellant and combusts the mixture to produce a gasified propellant flowstream, the gasification means including a preburner wherein said first and second fluid propellants are combined and partially burned to gasify the combustion products and substantially all of the unburned first fluid propellant flowstream.

2. A propulsion system as recited in claim 4 wherein said first fluid propellant is stored at a pressure below the operating pressure of the preburner, said preburner means further comprising means for pumping said first fluid propellant to the operating pressure of the preburner.

3. A propulsion system as recited in claim 2 wherein said pressurizing means includes a turbopump that uses the gasified fluid propellants as an energy source to produce the pumping energy to pressurize the first fluid propellant.

4. A propulsion system as recited in claim 3 wherein said turbopump includes a pump portion and a turbine portion, wherein substantially all of the gasified fluid propellants pass through the turbine portion.

5. A propulsion system as recited in claim 4 wherein said preburner is contained within the turbopump.

6. A self-contained propulsion system comprising:
   a solid fuel propellant grain;
   a motor casing for containing the solid fuel propellant grain;
   a fluid oxidizer that will combust with the solid fuel propellant grain, the oxidizer being stored in a liquid form apart from the solid propellant;
   gasification means for gasifying substantially all of the oxidizer before it is delivered to the motor casing;
   delivery means for delivering a first portion of the oxidizer from the gasification means to the motor casing to facilitate burning the combined propellants within the motor casing wherein the burning within the motor casing results in a fuel-rich mixture;
   a combustion chamber spaced apart from the gas generator for receiving a flowstream of the fuel-rich mixture generated within the motor casing; and
   wherein said delivery means delivers a second portion of the gasified oxidizer directly to the combustion chamber without passing through the motor casing to complete combustion of the fuel-rich mixture.

7. A propulsion system as recited in claim 6 wherein said second portion of the gasified oxidizer and said fuel-rich mixture are mixed in substantially stoichiometric proportions.

8. A propulsion system as recited in claim 6 further comprising a plurality of motor casings, each said motor casing having a solid propellant grain disposed therein and wherein the delivery means further delivers a portion of the gasified oxidant flowstream to each said motor casing.

9. A propulsion system as recited in claim 8 further comprising a plurality of combustion chambers, each said combustion chamber being arranged to receive a flowstream of the fuel-rich mixture from at least one of said motor casings.

10. A propulsion system as recited in claim 8 further comprising means for selectively controlling the supply of the oxidizer to the various motor casings to control the amount of solid fuel propellant burned.

11. A propulsion system as recited in claim 6 further comprising a gas injector for controlling the flow of the fuel-rich mixture from the motor casing into the combustion chamber.

12. A propulsion system as recited in claim 6 further comprising a fluid fuel that will combust with the oxidizer when ignited, and wherein the gasification means includes a preburner means for mixing, partially combusting, and gasifying the fluid fuel and oxidizer.

13. A propulsion system as recited in claim 12 wherein said fluid fuel is stored as a liquid.

14. A propulsion system as recited in claim 13 wherein said preburner has a controllable operating pressure.

15. In a hybrid rocket propulsion system that includes a liquid oxidant, a tank for containing the liquid oxidant, a solid fuel propellant grain contained within a motor casing, delivery means for delivering at least a portion of the oxidant to the motor casing, and ignition means for initiating combustion of the oxidant and solid propellant within the motor casing, the improvement comprising:
   a fluid fuel;
   preburner means for mixing a flowstream of the oxidant with a flowstream of the fluid fuel and combusting the mixture to gasify substantially all of the oxidant and to produce an oxidizer rich gaseous flowstream; and
   delivery means for supplying a first portion of the oxidizer rich gaseous flowstream to the motor casing for combustion with the solid propellant to produce combustion gases suitable for propelling the rocket.

16. A hybrid rocket propulsion system as recited in claim 15 wherein the combustion within the motor casing creates a fuel-rich mixture, the system further comprising a combustion chamber spaced apart from the motor casing for receiving and mixing a flowstream of the fuel-rich mixture and a second portion of the oxidizer-rich gaseous flowstream and combusting the mixture to produce additional combustion gases for propelling the rocket.

17. A hybrid rocket propulsion system as recited in claim 16 further comprising control means for combining said fuel-rich mixture flowstream and said oxidizer-rich flowstream in predetermined near stoichiometric proportions within said combustion chamber.

18. A hybrid rocket propulsion system as recited in claim 15 wherein said preburner means includes:
a preburner wherein said oxidizer and said fluid fuel are combusted, the preburner having an operating pressure; and
pumping means for pumping the oxidant from the tank into the preburner, the pumping means extracting energy from the oxidizer-rich gas produced in the preburner as its power source.

19. A hybrid rocket propulsion system as recited in claim 18 wherein said oxidizer is stored at a pressure below the operating pressure of the preburner, and said pumping means includes a turbopump.

20. A hybrid rocket propulsion system as recited in claim 19 wherein said turbopump includes a turbine portion and a pump portion, wherein substantially all of the oxidizer-rich flowstream pass through the turbine portion.

21. A hybrid rocket propulsion system comprising:
a solid fuel propellant grain;
a liquid oxidizer that will combust with said solid propellant when gasified and ignited;
a fluid fuel that will combust with said liquid oxidizer when ignited;
a turbopump for pressurizing and gasifying substantially all of the liquid oxidizer, the turbopump including a pump portion wherein said liquid oxidizer is pressurized, a preburner portion for mixing a flowstream of said liquid oxidant with a flowstream of said fluid fuel and combusting the mixture to create an oxidant-rich flowstream, and a turbine portion for extracting energy from the gasified oxidant-rich flowstream to power the pump portion;
a motor casing for housing the solid propellant; and
delivery means for delivering at least a portion of the oxidant-rich flowstream of the motor casing.

22. A hybrid rock propulsion system as recited in claim 21 wherein the turbopump further includes;
a drive shaft for coupling said turbine portion to said pump portion; and
a plurality of bearings for supporting said drive shaft.

23. A hybrid rocket propulsion system as recited in claim 22 wherein said turbopump further includes means for cooling said bearings using a small portion of the liquid oxidant as a cooling fluid wherein the liquid oxidant passes directly over the bearings.

* * * * *